(12) United States Patent
Crequer et al.

(10) Patent No.: US 11,410,474 B2
(45) Date of Patent: Aug. 9, 2022

(54) VEHICLE INSPECTION USING AUGMENTED REALITY (AR)

(71) Applicant: Verizon Patent and Licensing Inc., Arlington, VA (US)

(72) Inventors: Simon Crequer, Christchurch (NZ); Mark J. Hunter, Christchurch (NZ); Hannes T. Hille, Christchurch (NZ); Samuel M. Langley, Christchurch (NZ)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 747 days.

(21) Appl. No.: 16/404,345

(22) Filed: May 6, 2019

(65) Prior Publication Data

US 2020/0357204 A1  Nov. 12, 2020

(51) Int. Cl.
*G06V 20/20* (2022.01)
*G07C 5/08* (2006.01)
(Continued)

(52) U.S. Cl.
CPC ......... *G07C 5/0841* (2013.01); *G06Q 10/20* (2013.01); *G06T 7/0004* (2013.01); *G06T 19/006* (2013.01); *G06V 20/20* (2022.01)

(58) Field of Classification Search
CPC ......... G06Q 10/20; G06T 7/0004; G06T 7/70; G06T 19/006; G06T 2207/20024; G06T 2209/503; G06T 2207/20064; G06T 2207/20084; G06T 2207/20052; G06T 2207/20056; G06T 2207/30242; G06T 7/223; G06V 20/20; G06V 2201/08; G06V 10/20; G06V 10/82; G06V 10/454; G06V 10/75; G06V 10/95; G06V 10/40; G06V 20/00; G06V 40/20; G06V 40/161; G06V 2201/10; G07C 5/0841; G07C 5/008; G07C 2205/02; H04N 19/80; H04N 19/46; H04N 19/63; H04N 19/625; H04N 19/42; H04N 19/117; G06N 5/022; G06N 3/063; G06N 3/0454; G06N 3/08; G06N 3/04;
(Continued)

(56) References Cited

U.S. PATENT DOCUMENTS 10,740,975 B2 * 8/2020 Wu ................. G06T 19/006
10,742,399 B2 * 8/2020 Chen ................... H04N 19/80
(Continued)

OTHER PUBLICATIONS

Zollmann et al., FlyAR: Augmented Reality Supported Micro Aerial Vehicle Navigation, 2014, IEEE, p. 560-568 (Year: 2014).*
(Continued)

*Primary Examiner* — McDieunel Marc

(57) ABSTRACT

A device causes an augmented reality (AR) scene to be presented on a display that depicts a vehicle subject to a vehicle inspection, captures an image of the vehicle, and identifies a ground plane in the AR scene. The device identifies a location in the image that is part of the ground plane and that is known relative to the vehicle. The device superimposes a three-dimensional representation corresponding to the vehicle based on the location identified as part of the ground plane. The device generates, based on a user interaction with the display, vehicle inspection data that describes a state of a component of the vehicle. The device causes a vehicle inspection report to be created based on the vehicle inspection data.

20 Claims, 8 Drawing Sheets

(51) Int. Cl.
*G06Q 10/00* (2012.01)
*G06T 7/00* (2017.01)
*G06T 19/00* (2011.01)

(58) Field of Classification Search
CPC ...... G06F 16/54; G06F 9/5072; G06F 9/5044;
G06F 9/4881; G06F 21/53; G06F 21/44;
G06F 21/64; G06F 21/6254; G06F
16/538; G06F 21/45; G06F 16/535; G06F
16/951; G06F 9/5066; G06F 2209/506;
G06F 2221/2117; H04L 67/16; H04L
67/12; H04L 9/0643; H04L 9/3239; H04L
67/10; H04L 2209/38; G06K 9/6274;
G06K 9/6232; G06K 9/6217; G06K
9/6261; G06K 9/6215; G06K 9/6267;
H04W 4/70; H04W 12/02
See application file for complete search history.

(56) References Cited

U.S. PATENT DOCUMENTS

| | | | |
|---|---|---|---|
| 10,754,418 B1* | 8/2020 | Ruppert | G06T 7/70 |
| 10,766,498 B2* | 9/2020 | Kleen | G08G 1/166 |
| 10,773,169 B2* | 9/2020 | Leeper | G06T 19/006 |
| 2004/0105573 A1* | 6/2004 | Neumann | G06T 17/00 |
| | | | 382/103 |
| 2004/0179104 A1* | 9/2004 | Benton | G01C 21/20 |
| | | | 348/207.99 |

OTHER PUBLICATIONS

Zollmann et al., Augmented Reality for Construction Site Monitoring and Documentation, 2014, IEEE, p. 137-154 (Year: 2014).*

Wientapper et al., A camera-based calibration for automotive augmented reality Head-Up-Displays, 2013, IEEE, p. 189-197 (Year: 2013).*

Kumar et al., Aerial video surveillance and exploitation, 2001, IEEE, p. 1518-1539 (Year: 2001).*

* cited by examiner

| Example Supplemental Vehicle Inspection Information |
|---|
| • Instruction indicating which components to inspect<br>• Instruction indicating what to look for when inspecting a component<br>• Instruction indicating a level of detail to add when reporting observations<br>• Instruction that specifies a path to take to perform the inspection |

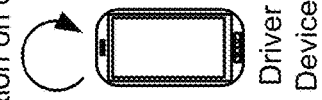

120
Superimpose supplemental vehicle inspection information on display

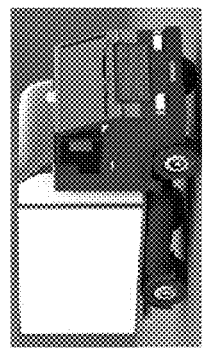

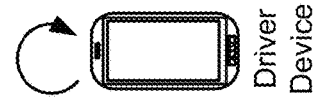

115
Superimpose 3-D representation of vehicle in the AR scene

FIG. 1C

VEHICLE INSPECTION USING AUGMENTED REALITY (AR)

BACKGROUND

Augmented reality (AR) may refer to a live view of a physical, real-world environment that is modified by a computing device to enhance an individual's current perception of reality. In augmented reality, elements of the real-world environment are "augmented" by computer-generated or extracted input, such as sound, video, graphics, haptics, global positioning system (GPS) data, and/or the like. Augmented reality may be used to enhance and/or enrich the individual's experience with the real-world environment.

BRIEF DESCRIPTION OF THE DRAWINGS

FIGS. 1A-1E are diagrams of one or more example implementations described herein.

DETAILED DESCRIPTION OF PREFERRED EMBODIMENTS

Figure 1A:
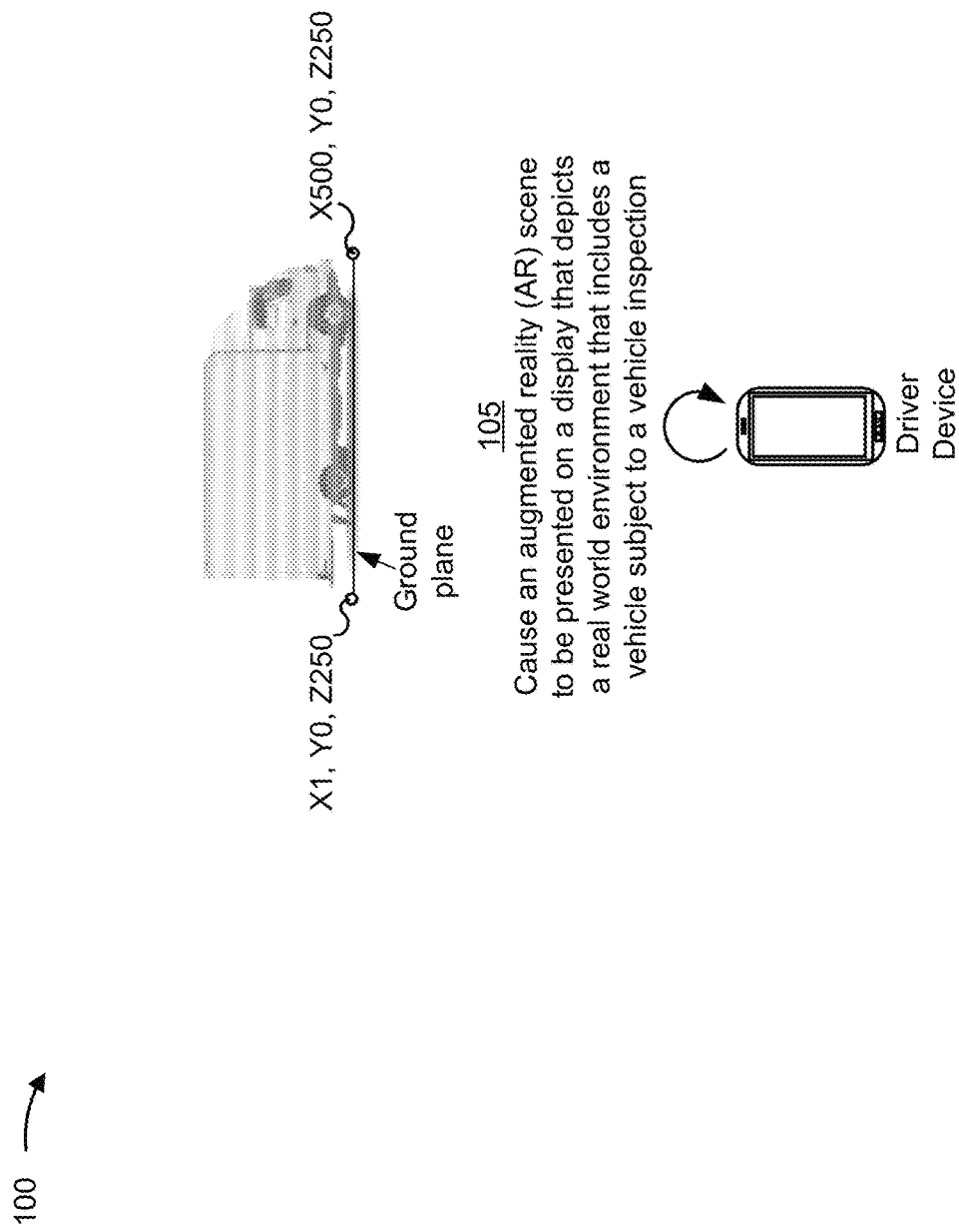

The following detailed description of example implementations refers to the accompanying drawings. The same reference numbers in different drawings may identify the same or similar elements.

Augmented reality (AR) may be used to superimpose three-dimensional (3-D) representations of objects on a display of an image of an environment that is being captured (e.g., in real time). For example, a user may use a camera of a user device (e.g., a smartphone, a tablet, smart glasses, and/or the like) to capture video of the user's surroundings, and the user device (e.g., an AR application running on the user device) may superimpose a 3-D representation of an object on the image being captured by the user device.

A driver vehicle inspection report (DVIR) is a formal record that confirms that a driver has completed an inspection of a vehicle. For example, a driver of a vehicle (e.g., a truck, a rental car, and/or the like) may be required to perform a vehicle inspection and may have to submit a DVIR as proof that the vehicle inspection has been completed. As a specific example, a driver may walk around a vehicle and perform a series of tasks to verify whether the vehicle is damaged, to describe any damage that has occurred, and/or the like.

However, a logistics organization that employs the driver may have difficulty verifying whether the vehicle inspection was completed properly. For example, the logistics organization may be unable to verify whether a driver walked completely around a vehicle, whether the driver inspected specific components of the vehicle (e.g., a wheel, a door, a window, and/or the like), whether the driver accurately reported any relevant points of interest (e.g., damage, wear and tear, and/or the like) on the specific components, and/or the like. If the driver does not perform the vehicle inspection properly, damage to the vehicle, for example, may not be repaired in a timely manner, thereby making the vehicle more susceptible to accidents.

Additionally, even if the driver completes the inspection properly, the DVIR may lack detail necessary for a mechanic to efficiently repair the vehicle. For example, the driver may indicate in the DVIR that a driveshaft of a truck has been damaged. However, the mechanic may not know which part of the driveshaft has been damaged and may waste processing resources and/or network resources of a device to perform a diagnostic of the vehicle to identify the damage, may waste repair time attempting to manually locate the part of the driveshaft that has been damaged, and/or the like.

Some implementations described herein permit a user device to execute a vehicle inspection application that uses augmented reality (AR) to assist a driver in performing and/or reporting a vehicle inspection of a vehicle. Before the driver performs the vehicle inspection, the driver may use the user device to launch the vehicle inspection application. The driver may point a camera of the user device at the vehicle (e.g., using the vehicle inspection application) to cause the user device to launch an AR scene for performing the vehicle inspection on a display that depicts a real world environment of the vehicle. In this case, the user device may identify a ground plane in an AR scene, may identify a location in the image that is part of the ground plane and that is known relative to the vehicle, and may superimpose a 3-D representation of the vehicle (sometimes referred to herein as superimposing a 3-D representation corresponding to the vehicle) in the AR scene based on the location of the ground plane that is known relative to the vehicle (e.g., such that the display presents the 3-D representation of the vehicle over the actual vehicle).

To perform the vehicle inspection, the driver may begin walking around the vehicle to search for any signs of damage and may interact with an image of the vehicle on the display (e.g., such as by interacting with the 3-D representation of the vehicle) to report on a state of one or more components of the vehicle. For example, the driver may interact with the display to identify a state of a component of the vehicle, to input a description of the identified state, to identify a specific location on the component of any points of interest (e.g., a specific location where the component is damaged, defective, and/or the like), and/or the like. When the driver interacts with the display, the user device may generate vehicle inspection data, such as component data that includes an identifier of the component that is being inspected, a state identifier for a type of state that the component is in, state data that describes a state of the component, and/or the like. Additionally, or alternatively, as the driver is performing the vehicle inspection, path data and time data may be generated that identify a path that the driver traversed while performing the inspection (and times spent at various locations along the path).

When the user device receives an indication that the vehicle inspection has been completed, the user device may generate and provide a vehicle inspection report (e.g., that is based on the vehicle inspection data, that includes the vehicle inspection data, and/or the like) to one or more other devices. For example, the user device may provide the vehicle inspection report to a device associated with a fleet manager that may verify one or more characteristics of the vehicle inspection, to a device associated with a mechanic who may use the vehicle inspection report to perform more efficient repairs (relative to mechanics that are unable to utilize a vehicle inspection report based on the vehicle inspection data), and/or the like.

In this way, the user device utilizes AR to efficiently and effectively support the driver in performing the vehicle inspection. Furthermore, by implementing use of the vehicle inspection application, the driver will be more likely to perform a proper vehicle inspection (e.g., because the driver may now be audited to verify that the vehicle inspection was completed properly), thereby improving lifespan of the vehicle, allowing vehicle damage to be repaired in a timely manner (relative to situations where the driver had not performed a timely vehicle inspection and/or did not identify damage on or within the vehicle), and/or the like. Additionally, by implementing a solution that is driven by AR, the user device conserves processing resources that would otherwise be expended by an inferior solution that relies on a global positioning system (GPS) technology to track positions of the driver during the vehicle inspection, conserves network resources relative to the inferior solution that relies on the GPS technology (e.g., because the solution driven by AR may be performed without a network connection and/or a cellular connection), and/or the like.

FIGS. 1A-1E are diagrams of one or more example implementations 100 described herein. For example, example implementation(s) 100 may include a first user device capable of supporting augmented reality (AR) technology (described and shown herein as a driver device), a vehicle inspection platform, a second user device associated with a fleet manager (described and shown herein as a fleet manager device), and a third user device associated with a mechanic (described and shown herein as a mechanic device). As shown in FIGS. 1A-1E, the driver device may use a vehicle inspection application that uses AR to assist a driver with performing a vehicle inspection and with reporting on the vehicle inspection.

While one or more implementations described herein involve the driver device performing one or more actions associated with assisting in the vehicle inspection, it is to be understood that this is provided by way of example. In practice, any number of actions described as being performed by the driver device may be performed by another device, such as the vehicle inspection platform and/or another device. Furthermore, while one or more implementations described herein involve the driver device using AR technology, it is to be understood that this is provided by way of example. In practice, the vehicle inspection application may support one or more other types of technologies, such as virtual reality (VR), mixed reality (MR), and/or the like.

As shown in FIG. 1A, and by reference number 105, the driver of the vehicle may cause an AR scene to be presented on a display that depicts a real world environment of a vehicle that is subject to a vehicle inspection. For example, the driver may interact with the driver device to launch the vehicle inspection application. This may cause an AR scene to be presented on the display of the driver device, such that the driver may reference content presented on the display while performing the vehicle inspection.

The vehicle may be a motorized vehicle (e.g., a truck, a car, a bus, and/or the like), a railed vehicle (e.g., a train, a tram, and/or the like), an electric vehicle, an autonomous vehicle, an aircraft, a watercraft, and/or the like. In the example shown, the vehicle may be a truck and the driver may have to perform routine vehicle inspections (e.g., daily, weekly, and/or the like) to comply with safety procedures of a logistics organization.

In some implementations, the user device may be configured with the vehicle inspection application and/or may be given access to the vehicle inspection application. For example, the vehicle inspection application may be a mobile application that is installed on the driver device, a web application (e.g., a website) that is accessible via a web browser on the driver device, and/or the like.

To begin the vehicle inspection, the driver may interact with the driver device to launch the vehicle inspection application (e.g., by opening a mobile application, entering a uniform resource locator (URL), and/or the like), to input login credentials needed to access the vehicle inspection application, and/or the like. This may cause the display to present an interface of the vehicle inspection application that includes a menu of AR scenes for different types of vehicle inspections (e.g., an AR scene may be different based on a type of vehicle inspection, an organization in charge of the vehicle inspection, vehicle safety laws in a geographic area in which the vehicle operates, and/or the like). In this case, the driver may interact with the display to select the AR scene dedicated to the vehicle inspection for the vehicle assigned to the driver. This may cause the display of the device to present an image of the vehicle in a real world environment in front of the driver.

In some implementations, the interface may automatically display the appropriate AR scene. For example, the vehicle inspection application may be configured to automatically launch a particular AR scene based on a geographic location of the driver device, based on a user identifier for the driver, based on a vehicle identifier for the vehicle, based on an identifier associated with logistics organization, and/or based on another type of configurable setting.

Once the AR scene is active, the driver device may capture image data of the real world environment of the vehicle. The image data may include an image that depicts the vehicle, a set of images that depict the vehicle, a video that depicts the vehicle, and/or the like.

In some implementations, the driver device may, while establishing the AR scene, identify a ground plane that is part of the AR scene. For example, the driver device may prompt the driver to point the camera of the driver device at the ground within the real world environment of the driver device. This may cause the driver to point the camera to capture an image that depicts the ground plane on at least a portion of the display of the driver device. The ground plane may be a horizontal plane within the real world environment of the vehicle (e.g., as captured by the camera of the driver device).

A position (e.g., of an object, such as the vehicle, the ground plane, a component of the vehicle, and/or the like), as used herein, may refer to a particular area of an image (as may be defined by, for example, a set of pixels associated with the particular area, a set of 3-D coordinates in the AR scene, and/or the like). For example, an area that defines the ground plane may, in some cases, be referred to herein as a position of the ground plane in an AR scene.

In some implementations, the driver device may identify the ground plane based on a first set of feature points in the image. For example, the driver device may use one or more computer vision techniques to process the image to determine a first set of feature points within the real world environment, which may be used to identify a position of the ground plane in the AR scene. A feature point may be any point capable of being distinguished from surrounding areas using the one or more computer vision techniques (e.g., and may be a pixel in the image, a set of pixels in the image, and/or the like). For example, the set of feature points may identify pixels located at edges of the ground plane (e.g., which collectively represent the position of the ground plane in the AR scene). The one or more computer vision techniques may include a corner recognition technique, an edge recognition technique, an image matching technique, an object recognition technique, and/or the like, and may be used to identify the first set of feature points relative to a position of the driver device (e.g., which may change as the driver device is moved to various locations in the real world environment).

In some implementations, the image that depicts the real world environment of the vehicle may map to a two-dimensional (2-D) coordinate space. For example, the image may include an array of pixels and the driver device may map pixels of the image to an array of points in the 2-D coordinate space. A point, as used herein, may refer to a set of coordinates in the 2-D coordinate space (e.g., where a set of coordinates includes an X coordinate and a Y coordinate), a set of coordinates in a three-dimensional (3-D) coordinate space (e.g., where the set of coordinates includes an X coordinate, a Y coordinate, and a Z coordinate), and/or the like.

In this way, the driver device causes the AR scene to be presented on the display and identifies the ground plane (e.g., the position of the ground plane in the AR scene), which may be used (e.g., with a location that is part of the ground plane and that is known relative to the vehicle) to superimpose a 3-D representation of the vehicle in the AR scene (e.g., which will be used during the vehicle inspection), as described further herein.

Figure 1B:
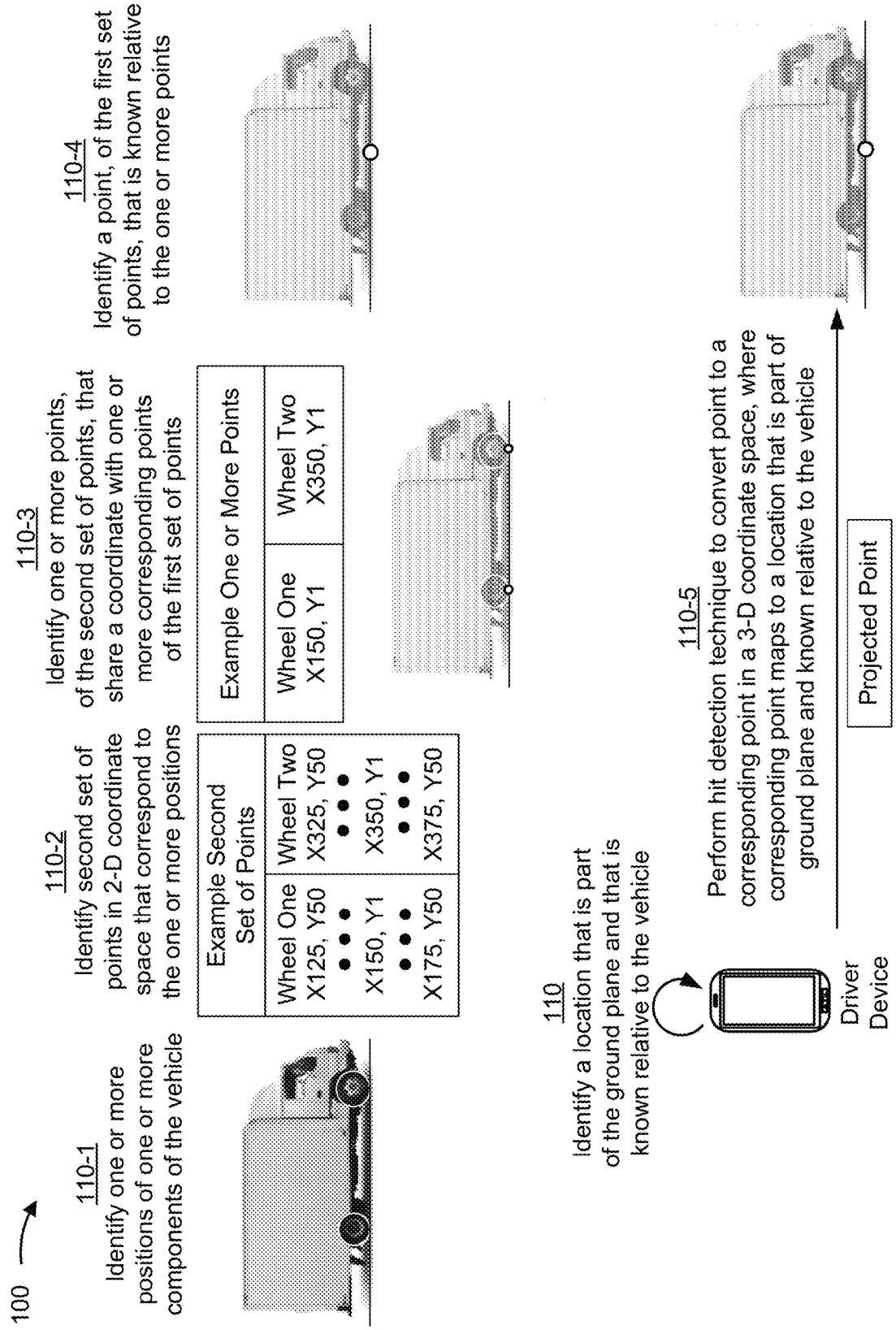

As shown in FIG. 1B, and by reference number 110, the driver device may identify a location that is part of the ground plane and that is known relative to the vehicle. For example, to accurately place a 3-D representation of the vehicle in the AR scene (e.g., such that the 3-D representation is placed precisely over the vehicle in the AR scene), the driver device may identify a location in the image that is part of the ground plane and that is known relative to the vehicle. The location may, for example, be one or more pixels of the ground depicted in the image that are aligned with one or more pixels of an identified component of the vehicle (e.g., a pixel of the ground depicted in the image may align with a corresponding pixel of an identified component of the vehicle if the pixel and the corresponding pixel share a Y coordinate value in a 2-D or a 3-D coordinate space). Additionally, or alternatively, the location may be one or more 3-D points of the ground plane that are aligned with one or more 3-D points of the identified component of the vehicle. The location may be provided by the driver and/or determined automatically, as described below.

To do this, as shown by reference number 110-1, the driver device may first identify one or more positions in the image of one or more components of the vehicle (e.g., such that the one or more positions may be used to identify the location that is part of the ground plane, which will be known relative to the one or more positions). For example, the driver device may identify a position of a component of the vehicle. In this case, the driver may point the camera of the driver device at the vehicle to cause the display to present an image of the vehicle. The driver device may use the one or more computer vision techniques, such as an object recognition technique, to process the image to identify a position of the component in the image. A component may be a wheel, a rim, a license plate, and/or any other component of the vehicle.

As an example, the driver device may perform an object recognition technique, such as a wheel recognition technique, to identify positions of two or more wheels of the vehicle. The wheel recognition technique may identify the two or more wheels by identifying circular objects in the image and may output, for each wheel, a position in the image (e.g., which is shown in FIG. 1B as white traced lines covering edges of the wheels), a radius for each wheel, and/or the like. In some cases, the driver device may perform an object recognition technique to identify positions of other types of components, such as a license plate, a window, a bumper, and/or the like.

In some implementations, the driver device may identify a type of vehicle (e.g., based on an identifier used when the driver signed on, based on an analysis of an image depicting the vehicle, and/or the like), which may allow the driver device to identify the one or more components more efficiently (relative to not identifying the type of vehicle). For example, if the driver device receives a vehicle type identifier for a type of vehicle with four wheels, the driver device may process the image using an assumption that a right hand side portion of the image includes one wheel and that a left hand side portion of the image includes a second wheel. This reduces a utilization of processing resources of the driver device relative to processing the entire image.

As another example, a larger vehicle (e.g., an 18-wheel truck, and/or the like) may have a contrast in brightness between rims (e.g., light) and tires (e.g., dark). This may allow the driver device to perform the wheel recognition technique in a manner that outputs the position of the wheels in the image, without having to perform the wheel recognition technique on the entire image. As another example, the driver device may scan a code associated with the vehicle (e.g., a quick response (QR) code) to identify a type of vehicle, to identify specific vehicle information (e.g., a vehicle year, a make of the vehicle, a model of the vehicle, and/or the like). This may allow the driver device to perform the wheel recognition technique in a manner that outputs the position of the wheels in the image, without having to perform the wheel recognition technique on the entire image.

As shown by reference number 110-2, the driver device may identify a second set of points in the 2-D coordinate space that correspond to the one or more positions. For example, the driver device may reference the array of points in the 2-D coordinate space to identify a second set of points that correspond to the one or more positions. In the example shown, the second set of coordinates may correspond to the positions of the wheels of vehicle (e.g., as shown by the white traced lines covering edges of the rims or the wheels).

As shown by reference number 110-3, the driver device may identify one or more points, of the second set of points, that share a coordinate with one or more corresponding points of the first set of points. For example, the driver device may compare the first set of points and the second set of points to identify one or more points, of the second set of points, that share a Y coordinate with one or more corresponding points of the first set of points. The one or more points may, in some implementations, correspond to one or more locations in the image where the one or more components connect to the ground plane.

In the example shown, the driver device may identify a first point of a first wheel (shown as a first point with coordinates X150, Y1) and may identify a second point of a second wheel (shown as a second point with coordinates X350, Y1). In some cases, the driver device may be configured with data that specifies a thickness of the tires (e.g., a section height of the tires) of the vehicle. For example, if the wheel detection technique identifies an edge of a rim of a tire (e.g., and not an edge of the tire as shown in the image), then the driver device may determine the radius for each rim and may add the radius of the rim and the width of the tire of each wheel to a Y coordinate of each wheel's center point. This may be used to identify the point that is in the center of each wheel (e.g., a center of a wheel at a point that contacts the ground in the image) and that comes in contact with the ground.

As shown by reference number 110-4, the driver device may identify a point (e.g., a 2-D point), of the first set of points, that is known relative to the one or more points. For example, the driver device may identify a 2-D point, of the first set of points in the 2-D coordinate space, that is known relative to the one or more of the second set of points in the 2-D coordinate space. Continuing with the example shown, the driver device may identify the 2-D point relative to the one or more 2-D points (e.g. by identifying a point on the ground plane that is equidistant between the first point and the second point).

As shown by reference number 110-5, the driver device may convert the point in the 2-D coordinate space (e.g., the 2-D point) to a corresponding 3-D point in the 3-D coordinate space. For example, the driver device may perform a hit detection technique to convert the 2-D point to a corresponding 3-D point, where the corresponding 3-D point maps to a location in the image that is part of the ground plane and that is known relative to the vehicle.

To perform the hit detection technique, the driver device may project one or more points (e.g., 2-D points) from a camera of the driver device onto the 3-D AR scene (e.g., onto the identified 2-D point, which is shown as the 2-D point on the ground plane that is equidistant between the two wheels of the vehicle), and may determine distances between the camera of driver device and the one or more points. The hit detection technique may succeed if a particular point is identified as being part of the ground plane and is known relative to the identified 2-D point or another known point on the vehicle. The hit detection technique may output a set of coordinates that define a 3-D point in the AR scene (e.g., the 3-D point may have an X coordinate, a Y coordinate, and a Z coordinate). The 3-D point may correspond to the location that is part of the ground plane and that is known relative to the vehicle.

One or more implementations described above permit the driver device to automatically identify the location that is part of the ground plane and that is known relative to the vehicle. Additionally, or alternatively, the driver device may identify a location that is part of the ground plane and that is known relative to the vehicle based on user input. For example, the driver may, after pointing the camera in a manner that causes the display to capture at least a portion of the ground in the real world environment, touch a portion of the display that depicts the ground. When the driver touches the portion of the display that depicts the ground, the driver device may project a point in a 2-D coordinate space onto the three-dimensional (3-D) AR scene. In this case, the driver device may determine a distance to the projected point (e.g., relative to a location of the driver device) and may determine a third coordinate (a Z coordinate) for the projected point based on the hit detection technique. By determining the third coordinate for the projected point, the driver device is able to map the projected point in the 2-D coordinate space to a particular point in the 3-D coordinate space (e.g., which includes the determined Z coordinate). The particular point in the 3-D coordinate space may map to the position of the ground plane in the AR scene.

In this way, the driver device identifies the location that is part of the ground plane and that is known relative to the vehicle.

As shown in FIG. 1C, and by reference number 115, the driver device may superimpose the 3-D representation of the vehicle in the AR scene. For example, the driver device may superimpose a 3-D representation of the vehicle in the AR scene by using the ground plane as a reference point (e.g., based on the location identified as part of the ground plane that is known relative to the vehicle). In this case, the driver device may obtain the 3-D representation of the vehicle (e.g., from a data structure) and/or may generate the 3-D representation of the vehicle (e.g., based on identifying a position of the vehicle in the image, which maps to points in the 3-D coordinate space), and may superimpose the 3-D representation of the vehicle in the AR scene. The 3-D representation of the vehicle (sometimes referred to herein as the 3-D representation corresponding to the vehicle) may include a 3-D wire frame that may be placed over the vehicle (e.g., an opaque 3-D wire frame, a transparent or translucent 3-D wire frame, and/or the like), a stock 3-D model of the vehicle (e.g., which may be opaque, transparent, and/or translucent), an actual 3-D model of the vehicle (e.g., as may be recreated by analyzing the image, in which case the 3-D representation might show actual wear and tear of the vehicle, and may be opaque, transparent, and/or translucent), and/or the like. As an example, the driver device may superimpose a 3-D wire frame into the AR scene such that the 3-D wire frame is placed over the vehicle depicted in the image.

Additionally, or alternatively, and as shown by reference number 120, the driver device may superimpose supplemental vehicle inspection information on the display (and/or into the AR scene). For example, the driver device may superimpose supplemental vehicle inspection information to assist the driver in performing the vehicle inspection.

The supplemental vehicle inspection information may include vehicle inspection instructions that describe to the driver a set of tasks to perform, such as an instruction that specifies a set of components of the vehicle to inspect, an instruction that specifies locations of where to perform particular inspections (e.g., by identifying locations of particular components to inspect), an instruction that specifies what to look for when inspecting a particular component, an instruction that specifies how much detail to go into when describing a state of a particular component, an instruction that specifies a path to take to perform the inspection (e.g., to ensure the driver inspects every side of the vehicle), an instruction that specifies a recommended time to spend performing the inspection, and/or the like. Additionally, or alternatively, the supplemental vehicle inspection information may include mechanic report information that describes one or more prior repairs that were made by a mechanic, driver comment information that describes a warning, suggestion, and/or reminder made by the driver or another driver, and/or the like.

In this way, the driver device superimposes a 3-D representation of the vehicle and/or supplemental vehicle inspection information on the display (and/or into the AR scene) to assist the driver in performing the vehicle inspection.

Figure 1D:
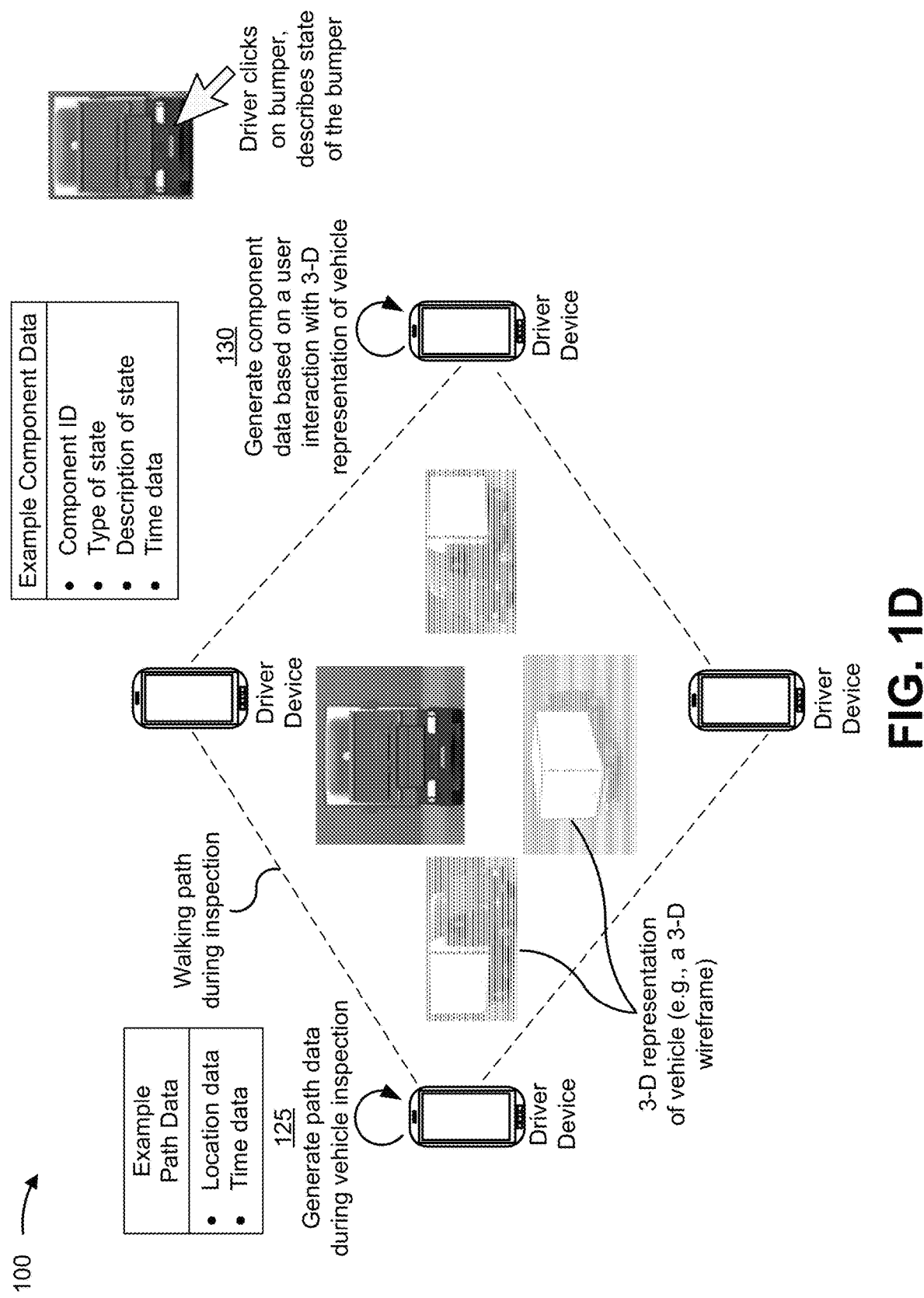

As shown in FIG. 1D, the driver may perform the vehicle inspection. For example, the driver may begin to walk around the vehicle to perform the vehicle inspection and may reference the AR scene while performing the vehicle inspection. In some implementations, the driver device may generate vehicle inspection data while the driver is performing the vehicle inspection. The vehicle inspection data may include data that is generated automatically during the vehicle inspection (e.g., path data) and/or data that is generated based on one or more user interactions with the 3-D representation of the vehicle (e.g., component data), as further described below.

For example, and as shown by reference number 125, the driver device may generate path data during the vehicle inspection. For example, the driver device may generate path data periodically (e.g., occasionally, during regular intervals, and/or the like) during the vehicle inspection. The path data may identify a path taken by the driver while performing the vehicle inspection and may include X coordinates and Z coordinates in the 3-D coordinate space for particular locations along the path, time data that identifies times that the driver spent at the particular locations, speed data that identifies a speed at which the user was walking while walking along the path, and/or the like. The path data may be used to generate a heat map that may be included in a vehicle inspection report, as described further herein.

Additionally, or alternatively, and as shown by reference number 130, the driver device may generate component data based on a user interaction with the 3-D representation of the vehicle. For example, the driver may walk around the vehicle to inspect a component and may interact with the display to select (e.g., touch, click on, and/or the like) a 3-D representation of the component (e.g., which may be part of the 3-D representation of the vehicle). When the 3-D representation of the component is selected, the display may update to allow the driver to input a type of state of the component, a description of the state of the component, a photo of the component, an audio recording with audio describing the component, a location in the image of a point of interest in the component (e.g., a part of the component that is damaged, defective, has visible wear and tear, and/or the like), and/or the like.

Additionally, or alternatively, the driver device may generate component data that includes location data that identifies a specific point (or set of points) in the 3-D coordinate space that correspond(s) to a specific location on the component that is damaged, is defective, has visible wear and tear, and/or the like. For example, a driver may select a specific location on the 3-D representation of the component that is a point of interest. This may cause the driver device to generate the location data that identifies the specific point (or set of points) in the 3-D coordinate space that correspond (s) to the specific location on the component that is damaged.

As shown as an example, if a bumper of a truck has been damaged, the driver may interact with a 3-D representation of the bumper to input a state of the bumper (e.g., average condition, but a dent is now visible), to describe the state of the bumper (e.g., by describing the dent), to identify a specific location (or locations) on the bumper that has the dent (e.g., by clicking on a specific part of the bumper that has the dent), and/or the like. This may cause the driver device to generate corresponding component data to record observations made by the driver while inspecting the bumper.

In some implementations, the driver device may automatically generate component data describing a component of the vehicle. For example, the driver device may have access to a data structure used to store images that depict previously identified points of interest found on similar components (e.g., where a point of interest is visible damage to a component, a visible defect of a component, visible wear and tear to the component, and/or the like). In this case, while the driver is performing the vehicle inspection, the driver may point a camera of the driver device at a specific component of the vehicle, which may cause the driver device to compare an image of the specific component that is being presented on the display and the set of images that depict the previously identified points of interest.

In some implementations, the driver device may use a data model that has been trained using machine learning to determine whether an image of the vehicle includes one or more points of interest. For example, the driver device may have trained a data model, may receive a trained data model, and/or may have access to the trained data model, where the data model is able to receive image data as an input and is able to output one or more scores that indicate likelihoods of the image data depicting one or more points of interest.

To train the data model, a training device (e.g., the driver device or another device used to train the data model) may process a database of images of vehicles that include points of interest using a set of feature identification techniques. The set of feature identification techniques may be used to identify a set of features that are to be used to train the data model. To provide a specific example, a collection of pixels that depict a bent fender may serve as a feature that is indicative of a point of interest that corresponds to a damaged fender. In this case, the training device may train the data model using the set of features and one or more machine learning techniques, such that the data model is able to receive image data as an input and to output one or more scores that indicate likelihoods of the image data depicting the one or more points of interest.

To use the data model, the driver device may provide an image of the vehicle as input to the data model. This may cause the data model to output one or more scores that indicate the likelihoods of the image depicting one or more points of interest. In this case, the driver device may compare the one or more scores to a threshold confidence score and may determine whether particular points of interest are present in the image based on whether the one or more scores satisfy the threshold confidence score.

In some implementations, the driver device may automatically prompt the driver when a particular task of an inspection needs to be performed. For example, the driver device may be configured with a set of tasks that are be performed on the vehicle during the inspection. In this case, the driver device may, based on a geographic location of the driver, cause an interface of the driver device to display to the driver a reminder to perform a particular task, instructions for performing the particular task, and/or the like.

Additionally, or alternatively, the driver device may automatically prompt the driver based on image recognition of a vehicle component that is targeted for inspection, image recognition of cargo that is targeted for inspection, and/or the like. For example, if a particular vehicle component is identified by a camera of the driver device, the driver device may cause the interface to display a reminder to inspect the vehicle component, instructions relating to the inspection of the vehicle component, and/or the like.

Additionally, or alternatively, the driver device may ensure that one or more tasks of an inspection are completed. For example, the driver device may require that the driver inspect particular vehicle components of the vehicle (e.g., particular wheels), particular cargo, and/or the like. If the driver walks around the entire vehicle and does not inspect a particular vehicle component (e.g., a particular wheel), the driver device may cause an interface to display an indication that the particular vehicle component has yet to be inspected, may indicate that the inspection will not be marked as completed until the particular vehicle component is inspected, and/or the like.

In this way, the driver device assists the driver with performing the vehicle inspection.

Figure 1E:
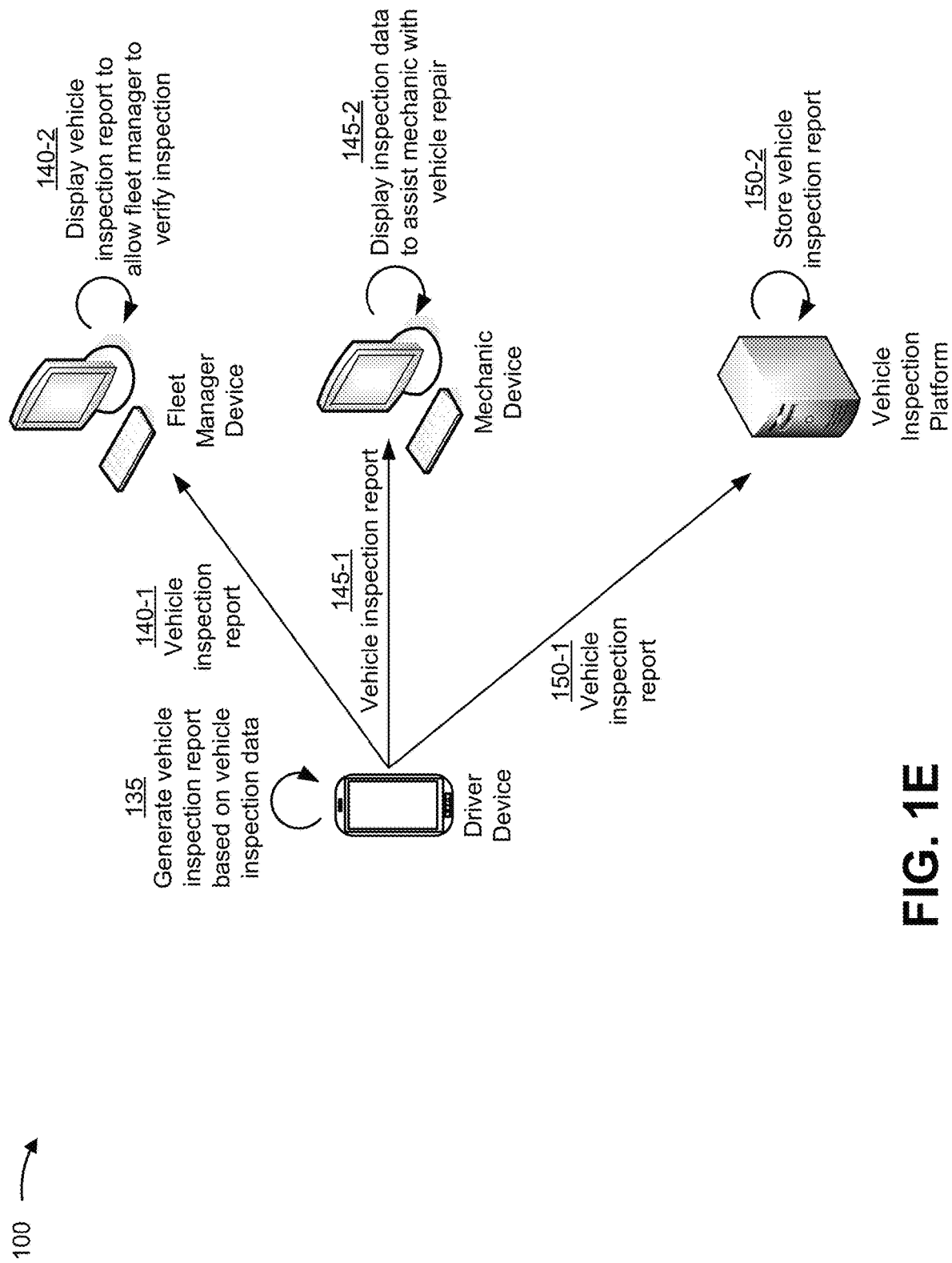

As shown in FIG. 1E, and by reference number 135, the driver device may generate a vehicle inspection report based on the vehicle inspection data. For example, the driver device may generate a vehicle inspection report based on an indication that the vehicle inspection has been completed. The vehicle inspection report may be a driver vehicle inspection report (DVIR) and/or a similar type of report. The vehicle inspection report may include the vehicle inspection data, data that is generated based on the vehicle inspection data, and/or other data related to the vehicle inspection.

In some implementations, the driver device may generate a vehicle inspection report that includes the vehicle inspection data. For example, the driver device may automatically populate a set of fields of a vehicle inspection report with values included in the vehicle inspection data.

In some implementations, the driver device may generate heat map data based on the path data. For example, the driver device may generate heat map data that depicts the path taken by the driver while performing the vehicle inspection. In this case, the driver device may generate the heat map such that a display presenting the heat map presents the path taken the driver using a color scheme that assigns colors to particular locations along the path based on a time that the driver spent at each of the particular locations, based on a speed at which the user walked along the path, and/or the like. The heat map data may be included as part of the vehicle inspection report. In some implementations, the driver device may provide the path data to the vehicle inspection platform and the vehicle inspection platform may generate the heat map.

In some implementations, the driver device may provide the vehicle inspection data to another device (e.g., the vehicle inspection platform, the fleet manager device, and/or the like) to permit the other device to generate the vehicle inspection report. For example, the driver device may provide the vehicle inspection data to the fleet manager device and/or the vehicle inspection platform to permit the fleet manager device and/or the vehicle inspection platform to generate the vehicle inspection report.

As shown by reference number 140-1, the vehicle inspection platform may provide the vehicle inspection report to the fleet manager device. For example, the driver device may use an application programming interface (API) or another type of communication interface to provide the vehicle inspection report to the fleet manager device. As shown by reference number 140-2, the fleet manager device may access the vehicle inspection report via a web interface or application interface to verify whether the vehicle inspection has been completed, to determine a quality with which the vehicle inspection was completed, to identify any points of interest on the vehicle (e.g., places where the vehicle may have damage, a defect, and/or the like), to display the heat map depicting the path taken by the driver while performing the inspection, and/or the like.

As shown by reference number 145-1, the driver may provide the vehicle inspection report to the mechanic device. For example, the driver device may use an API or another type of communication interface to provide the vehicle inspection report to the mechanic device. As shown by reference number 145-2, the mechanic device may display the vehicle inspection report to assist a mechanic with performing a repair. For example, the mechanic device may access the vehicle inspection report via a web interface or application interface and display the 3-D representation of the vehicle to allow the mechanic to identify the specific location(s) where the driver identified damage, a defect, visible wear and tear, and/or the like. In some implementations, the mechanic device may have access to an AR scene capable of displaying the 3-D representation of the vehicle, to the component data generated by the driver device, to the heat map generated by the driver device, and/or the like, to further assist the mechanic in performing one or more vehicle repairs.

As shown by reference number 150-1, the driver device may provide the vehicle inspection report to the vehicle inspection platform (e.g., using an API or another type of communication interface). As shown by reference number 150-2, the vehicle inspection platform may store the vehicle inspection report. For example, the vehicle inspection platform may store the vehicle inspection report such that the report may be used at a later time by the fleet manager device, by the mechanic device, by an auditor device (e.g., a device used by an auditor to perform an audit of the vehicle inspection), and/or the like.

In this way, the driver device uses AR of the vehicle inspection application to efficiently and effectively support the driver in performing and reporting on the vehicle inspection.

As indicated above, FIGS. 1A-1E are provided merely as one or more examples. Other examples may differ from what is described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
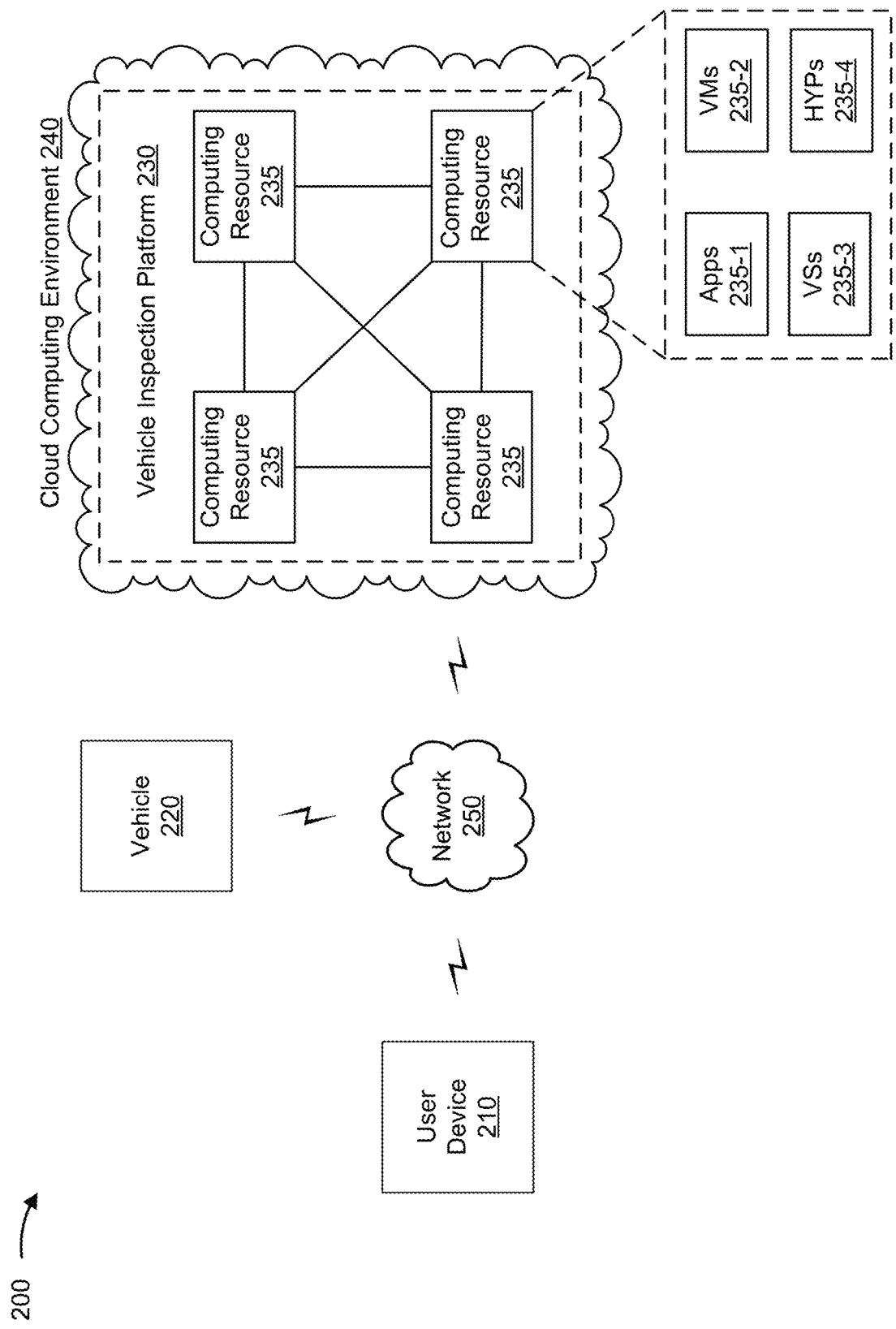
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user device 210, a vehicle 220, a vehicle inspection platform 230 hosted within a cloud computing environment 240, and/or a network 250. Devices of environment 200 may interconnect via wired connections, wireless connections, or a combination of wired and wireless connections.

User device 210 includes one or more devices capable of receiving, generating, storing, processing, and/or providing information associated with a vehicle inspection. For example, user device 210 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, smart clothing, and/or the like), or a similar type of device. In some implementations, user device 210 may include a display, an image capture component (e.g., a sensor, a camera, a camcorder, and/or the like), a location tracking component (e.g., a global positioning system (GPS), an accelerometer, and/or the like), and/or the like.

In some implementations, user device 210 may support a vehicle inspection application that utilizes augmented reality (AR) technology. In some implementations, user device 210 may access a vehicle inspection application that utilizes AR technology and is supported on another device (e.g., vehicle inspection platform 230, and/or the like). In some implementations, user device 210 may assist a driver of vehicle 220 with performing a vehicle inspection (e.g., using the vehicle inspection application), in a manner described elsewhere herein.

In some implementations, a first user device 210 may support the vehicle inspection application and one or more other user devices 210 may access a vehicle inspection report generated based on performance of the vehicle inspection. For example, a second user device associated with a fleet manager may be provided with the vehicle inspection application, a third user device associated with a mechanic may be provided with the vehicle inspection application, and/or the like, as described in further detail elsewhere herein.

Vehicle 220 includes a mobile machine (e.g., that transports people and/or cargo). For example, a vehicle may include a motorized vehicle (e.g., a truck, a car, a bus, and/or the like), a railed vehicle (e.g., a train or a tram), a watercraft (e.g., a ship, a boat, a submarine, etc.), an aircraft (e.g., a plane, a glider, or an unmanned aerial vehicle (UAV)), a spacecraft, an electric vehicle (e.g., an electric truck or car), a moped, a scooter, and/or the like. In some implementations, vehicle 220 may include an autonomous vehicle, such as an autonomous truck or car, an autonomous boat, and/or the like. In some implementations, vehicle 220 may include a navigational system (e.g., a GPS system, etc.). In some implementations, vehicle 220 may be subject to a vehicle inspection.

Vehicle inspection platform 230 includes one or more devices capable of receiving, storing, generating, determining, and/or providing information associated with a vehicle inspection. For example, vehicle inspection platform 230 may include a server device (e.g., a host server, a web server, an application server, etc.), a data center device, or a similar device. In some implementations, vehicle inspection platform 230 may be capable of hosting and/or supporting an AR scene, according to one or more implementations described herein.

In some implementations, as shown, vehicle inspection platform 230 may be hosted in cloud computing environment 240. While implementations described herein describe vehicle inspection platform 230 as being hosted in cloud computing environment 240, in some implementations, vehicle inspection platform 230 might not be cloud-based (i.e., may be implemented outside of a cloud computing environment) or may be partially cloud-based.

Cloud computing environment 240 includes an environment that hosts vehicle inspection platform 230. Cloud computing environment 240 may provide computation, software, data access, storage, etc. services that do not require end-user knowledge of a physical location and configuration of system(s) and/or device(s) that hosts vehicle inspection platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host vehicle inspection platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210 and/or vehicle 220. Application 235-1 may eliminate a need to install and execute the software applications on these devices. For example, application 235-1 may include software associated with vehicle inspection platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, vehicle 220, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
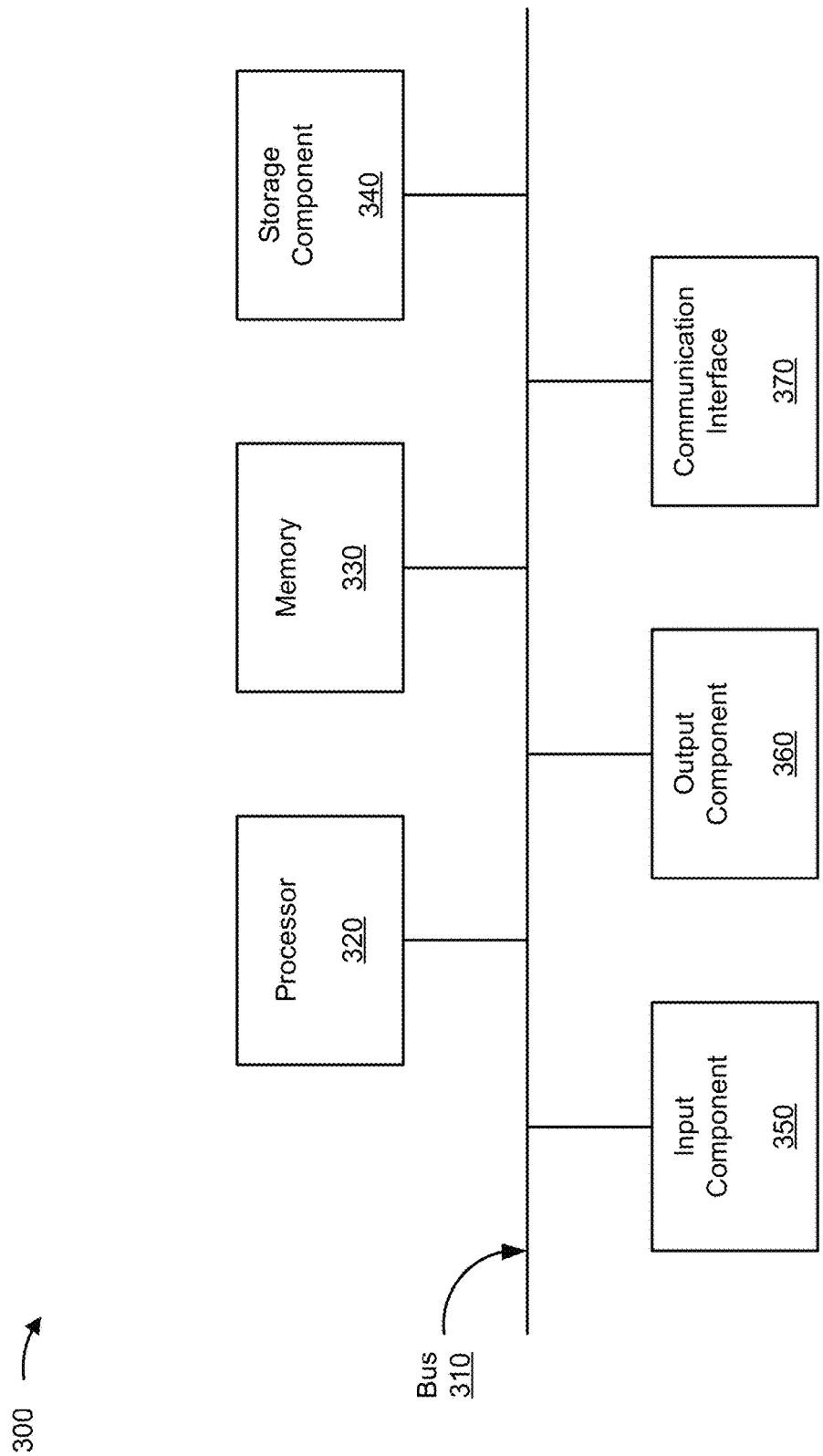
FIG. 3 is a diagram of example components of one or more devices of FIG. 2.

FIG. 3 is a diagram of example components of a device 300. Device 300 may correspond to user device 210, vehicle 220, and/or vehicle inspection platform 230. In some implementations, user device 210, vehicle 220, and/or vehicle inspection platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
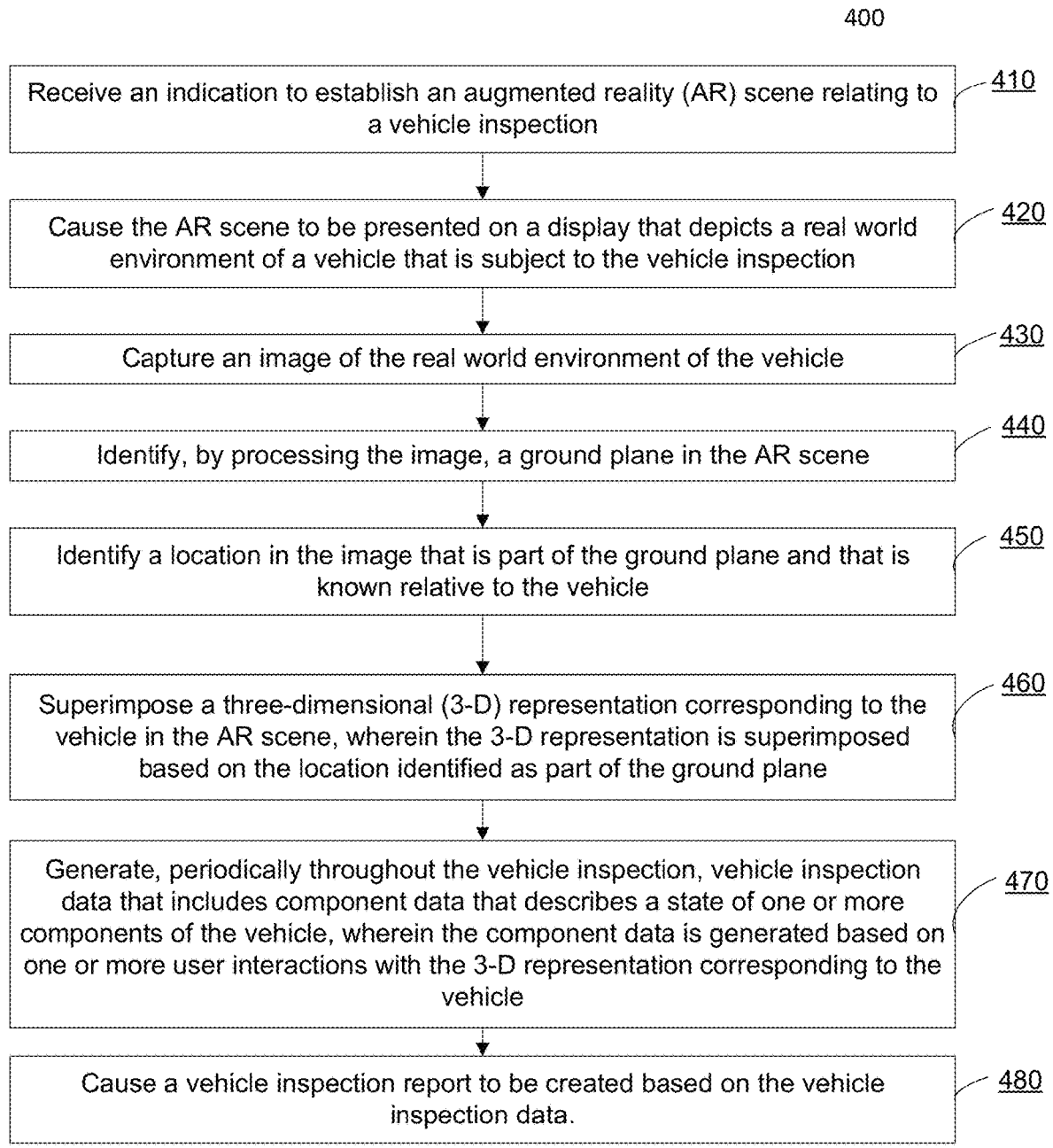
FIG. 4 is a flowchart of an example process for performing a vehicle inspection using augmented reality (AR).

FIG. 4 is a flow chart of an example process 400 for performing a vehicle inspection using augmented reality (AR). In some implementations, one or more process blocks of FIG. 4 may be performed by a user device (e.g., user device 210). In some implementations, one or more process blocks of FIG. 4 may be performed by another device or a group of devices separate from or including the user device, such as one or more other user devices (e.g., one or more other user devices 210), a vehicle (e.g., vehicle 220), a vehicle inspection platform (e.g., vehicle inspection platform 230), and/or the like. In some implementations, the user device may include a camera, a display, one or more memories, and one or more processors, operatively coupled to the one or more memories.

As shown in FIG. 4, process 400 may include receiving an indication to establish an augmented reality (AR) scene relating to a vehicle inspection (block 410). For example, the user device (e.g., using processor 320, memory 330, storage component 340, input component 350, communication interface 370, and/or the like) may receive an indication to establish an augmented reality (AR) scene relating to a vehicle inspection, as described above.

As further shown in FIG. 4, process 400 may include causing the AR scene to be presented on a display that depicts a real world environment of a vehicle that is subject to the vehicle inspection (block 420). For example, the user device (e.g., using processor 320, memory 330, storage component 340, input component 350, output component 360, communication interface 370, and/or the like) may cause the AR scene to be presented on a display that depicts a real world environment of a vehicle that is subject to the vehicle inspection, as described above.

As further shown in FIG. 4, process 400 may include capturing an image of the real world environment of the vehicle (block 430). For example, the user device (e.g., using processor 320, memory 330, storage component 340, input component 350, communication interface 370, and/or the like) may capture an image of the real world environment of the vehicle, as described above.

As further shown in FIG. 4, process 400 may include identifying, by processing the image, a ground plane in the AR scene (block 440). For example, the user device (e.g., using processor 320, memory 330, storage component 340, and/or the like) may identify, by processing the image, a ground plane in the AR scene, as described above.

In some implementations, the user device may identify a particular position in the image of a license plate. In some implementations, the user device may determine a center point within the particular position. In some implementations, the user device may identify a set of points in a two-dimensional (2-D) coordinate space based on the particular position of the license plate in the image and the center point.

As further shown in FIG. 4, process 400 may include identifying a location in the image that is part of the ground plane and that is known relative to the vehicle (block 450). For example, the user device (e.g., using processor 320, memory 330, storage component 340, and/or the like) may identify a location in the image that is part of the ground plane (e.g., that corresponds to part of the ground plane) and that is known relative to the vehicle, as described above.

In some implementations, when identifying the location in the image that is part of the ground plane, the user device may identify, by using one or more computer vision techniques (e.g., a circle recognition technique, an edge detection technique, and/or the like) to process the image, one or more positions in the image for one or more specific components of the vehicle. In this case, the user device may identify a particular point in the 2-D coordinate space that is part of the ground plane and is known relative to the set of points and may map the particular point that is part of the ground plane to a point in a 3-D coordinate space using a hit detection technique.

Additionally, when identifying the one or more positions in the image for the one or more specific components of the vehicle, the user device may identify, as the one or more positions in the image, two or more positions that correspond to two or more wheels of the vehicle. In this case, the user device may determine radiuses of the two or more wheels of the vehicle, and may identify the set of points in a two-dimensional (2-D) coordinate space based on the two or more positions that correspond to the two or more determined radiuses of the two or more wheels.

In some implementations, when identifying the location in the image that is part of the ground plane, the user device may receive, based on a user interaction with the display, an indication that the user has selected a particular location on the ground plane. In this case, the user device may identify the particular location as part of the ground plane based on receiving the indication.

As further shown in FIG. 4, process 400 may include superimposing a three-dimensional (3-D) representation corresponding to the vehicle in the AR scene, wherein the 3-D representation is superimposed based on the location identified as part of the ground plane (block 460). For example, the user device (e.g., using processor 320, memory 330, storage component 340, output component 360, communication interface 370, and/or the like) may superimpose a three-dimensional (3-D) representation corresponding to the vehicle in the AR scene, as described above. In some implementations, the 3-D representation may be superimposed based on the location identified as part of the ground plane.

As further shown in FIG. 4, process 400 may include generating, periodically during the vehicle inspection, vehicle inspection data that includes component data that describes a state of one or more components of the vehicle, wherein the component data is generated based on one or more user interactions with the 3-D representation corresponding to the vehicle (block 470). For example, the user device (e.g., using processor 320, memory 330, storage component 340, and/or the like) may generate, periodically during the vehicle inspection, vehicle inspection data that includes component data that describes a state of one or more components of the vehicle, as described above. In some implementations, the component data may be generated based on one or more user interactions with the 3-D representation corresponding to the vehicle.

In some implementations, the vehicle inspection data may include path data that identifies a path taken by a user while performing the vehicle inspection. In some implementations, the user device may generate a heat map based on the path data. In some implementations, the vehicle inspection data may include time data that indicates times that the user spent at particular positions along the path. In some implementations, when generating the heat map, the user device may generate the heat map in a manner that maps particular colors to the particular positions along the path, based on times that the user spent at the particular positions along the path.

In some implementations, the component data describes a state of at least one component as damaged and includes path data that identifies particular points in a 3-D coordinate space at which the at least one component is damaged.

As further shown in FIG. 4, process 400 may include causing a vehicle inspection report to be created based on the vehicle inspection data (block 480). For example, the user device (e.g., using processor 320, memory 330, storage component 340, input component 350, output component 360, communication interface 370, and/or the like) may cause a vehicle inspection report to be created based on the vehicle inspection data, as described above.

In some implementations, the user device may cause the vehicle inspection report to be created based on the heat map. For example, the user device may cause the vehicle inspection report to be created such that the heat map is included in the vehicle inspection report, may cause the vehicle inspection report to be created in a manner that includes information included in and/or described by the heat map, and/or the like. In some implementations, the user device may provide the vehicle inspection report to another device. For example, the user device may provide the image of the user as part of the vehicle inspection report to verify that the user is a registered driver. In some implementations, the user device may provide the vehicle inspection report for display on an interface accessible to the other device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, an indication to establish an augmented reality (AR) scene relating to a vehicle inspection;
    causing, by the device, the AR scene to be presented on a display that depicts a real world environment of a vehicle that is subject to the vehicle inspection;
    capturing, by the device, an image of the real world environment of the vehicle;
    identifying, by the device and by processing the image, a ground plane in the AR scene;
    identifying, by the device, a location in the image that is part of the ground plane and that is known relative to the vehicle;
    superimposing, by the device, a three-dimensional (3-D) representation corresponding to the vehicle in the AR scene,
        wherein the 3-D representation is superimposed based on the location identified as part of the ground plane;
    generating, by the device and periodically during the vehicle inspection, vehicle inspection data that includes component data that describes a state of one or more components of the vehicle,
        wherein the component data is generated based on one or more user interactions with the 3-D representation corresponding to the vehicle; and
    causing, by the device, a vehicle inspection report to be created based on the vehicle inspection data.

2. The method of claim 1, wherein identifying the location in the image that is part of the ground plane comprises:
    identifying, by using a computer vision technique to process the image, one or more positions in the image for one or more specific components of the vehicle,
        wherein the one or more positions in the image map to a set of points in a two-dimensional (2-D) coordinate space,
    identifying a particular point in the 2-D coordinate space that is part of the ground plane and is known relative to the set of points, and
    mapping the particular point that is part of the ground plane to a point in a 3-D coordinate space using a hit detection technique, wherein the point in the 3-D coordinate space maps to the location in the image that is part of the ground plane.

3. The method of claim 2, wherein identifying the one or more positions in the image for the one or more specific components of the vehicle comprises:
identifying, as the one or more positions in the image, two or more positions that correspond to two or more wheels of the vehicle,
determining radiuses of the two or more wheels of the vehicle, and
identifying the set of points in a two-dimensional (2-D) coordinate space based on the two or more positions that correspond to the two or more and determined radiuses of the two or more wheels.

4. The method of claim 1, wherein identifying the location in the image that is part of the ground plane comprises:
receiving, based on a user interaction with the display, an indication that a user has selected a particular location on the ground plane, and
identifying the particular location as part of the ground plane based on receiving the indication.

5. The method of claim 1, wherein the vehicle inspection data includes path data that identifies a path taken by a user while performing the vehicle inspection;
wherein the method further comprises:
generating a heat map based on the path data; and
wherein causing the vehicle inspection report to be created comprises:
causing the vehicle inspection report to be created based on the heat map.

6. The method of claim 5, wherein the vehicle inspection data includes time data that indicates times that the user spent at particular positions along the path; and
wherein generating the heat map comprises:
generating the heat map in a manner that maps particular colors to the particular positions along the path, based on an amount of time that the user spent at the particular positions along the path.

7. The method of claim 1, wherein the component data describes a state of at least one component as damaged and includes path data that identifies particular points in a 3-D coordinate space at which the at least one component is damaged.

8. A device, comprising:
a camera;
a display;
one or more memories; and
one or more processors, operatively coupled to the one or more memories, to:
receive an indication to establish an augmented reality (AR) scene relating to a vehicle inspection;
cause the AR scene to be presented on the display, wherein the display depicts a real world environment of a vehicle that is subject to the vehicle inspection;
receive one or more images of the real world environment of the vehicle;
identify a ground plane in the AR scene;
identify a location in the one or more images that is part of the ground plane and that is known relative to the vehicle;
superimpose a three-dimensional (3-D) representation corresponding to the vehicle based on the location in the one or more images that is part of the ground plane;
receive vehicle inspection data that includes component data describing a state of one or more components of the vehicle,
wherein the component data for a component, of the one or more components, is received based on a user interaction with the 3-D representation corresponding to the vehicle; and
provide a vehicle inspection report that includes the vehicle inspection data to another device.

9. The device of claim 8, wherein the one or more processors, when identifying the location in the one or more images that represent the ground plane, are to:
identify one or more positions in the image for one or more specific components of the vehicle using one or more computer vision techniques,
wherein the one or more positions in the image map to a set of points in a two-dimensional (2-D) coordinate space,
identify a particular point in the 2-D coordinate space that is part of the ground plane and is known relative to the set of points, and
perform a hit detection technique to identify a point in a 3-D coordinate space on the vehicle that maps to the particular point,
wherein the point in the 3-D coordinate space is the location in the one or more images.

10. The device of claim 9, wherein the one or more processors, when identifying the one or more positions in the image for the one or more components of the vehicle, are to:
identify, within an image, of the one or more images, particular positions that correspond to two or more wheels of the vehicle using a circle recognition technique of the one or more computer recognition techniques,
determine radiuses of the two or more wheels of the vehicle, and
identify the set of points in a two-dimensional (2-D) coordinate space for the two or more wheels based on the particular positions and radiuses of the two or more wheels.

11. The device of claim 8, wherein the one or more processors, when identifying the location in the one or more images that is part of the ground plane, are to:
receive, based on a user interaction with the display, a particular indication that a user has selected a particular location on the ground plane, and
identify the location as the particular location as part of the ground plane based on receiving the particular indication.

12. The device of claim 8, wherein the component data for a component, of the one or more components, includes data that identifies one or more points in a 3-D coordinate space that are identified as one or more points of interest that affect a particular state of the component; and
wherein the one or more processors, when providing the vehicle inspection report to the other device, are to:
provide the vehicle inspection report that includes the data that identifies the one or more points for display on an interface accessible to the other device.

13. The device of claim 8, wherein the vehicle inspection data includes time data that indicates times that the user spent at particular positions along a path taken by a user while performing the inspection; and
wherein the one or more processors are further to:
generate a heat map in a manner that maps particular colors to the particular positions along the path, based on an amount of time the user spends at the particular positions along the path.

14. The device of claim 8, wherein the one or more processors are further to:
receive, from the camera, an image of a user during the vehicle inspection; and
wherein the one or more processors, when providing the vehicle inspection report to the other device, are to:
provide the image of the user as part of vehicle inspection to verify that the user is a registered driver.

15. A non-transitory computer-readable medium storing instructions, the instructions comprising:
one or more instructions that, when executed by one or more processors, cause the one or more processors to:
receive an indication to establish an augmented reality (AR) scene relating to a vehicle inspection;
cause the AR scene to be presented on a display that depicts a real world environment of a vehicle that is subject to the vehicle inspection;
capture an image of the real world environment of the vehicle;
identify a ground plane in the AR scene;
identify a location in the image that is part of the ground plane and that is known relative to the vehicle;
superimpose a three-dimensional (3-D) representation corresponding to the vehicle in the AR scene,
wherein the 3-D representation is superimposed based on the location identified as part of the ground;
generate, based on one or more user interactions with the 3-D representation corresponding to the vehicle, vehicle inspection data that includes at least one of:
component data describes a state of one or more components of the vehicle,
location data that identifies a particular location of a component, of the one or more components, that has been inspected, or
time data that indicates times that a user spent at particular positions along a path used to perform the vehicle inspection; and
cause a vehicle inspection report to be created based on the vehicle inspection data.

16. The non-transitory computer-readable medium of claim 15, wherein the one or more instructions, that cause the one or more processors to identify the location in the image that is part of the ground plane, cause the one or more processors to:
identify, using a computer vision technique, one or more positions in the image for one or more specific components of the vehicle,
wherein the one or more positions map to a set of points in a two-dimensional (2-D) coordinate space,
identify a particular point that is part of the ground plane and is known relative to the set of points, and
map the particular point that is part of the ground plane to a point in a 3-D coordinate space using a hit detection technique,
wherein the point in the 3-D coordinate space is the location in the image that is part of the ground plane and that is known relative to the vehicle.

17. The non-transitory computer-readable medium of claim 16, wherein the one or more instructions, that cause the one or more processors to identify the one or more positions in the image for the one or more specific components of the vehicle, cause the one or more processors to:
identify particular positions in the image of two or more wheels of the vehicle,
determine radiuses of the two or more wheels of the vehicle, and
identify the set of points in a two-dimensional (2-D) coordinate space based on the particular positions of the two or more wheels and the radiuses of the two or more wheels.

18. The non-transitory computer-readable medium of claim 16, wherein the one or more instructions, that cause the one or more processors to identify the particular positions in the image, cause the one or more processors to:
identify a particular position in the image of a license plate,
determine a center point within the particular position, and
identify the set of points in a two-dimensional (2-D) coordinate space based on the particular position of the license plate in the image and the center point.

19. The non-transitory computer-readable medium of claim 15, wherein the one or more instructions, that cause the one or more processors to identify the location in the image that is part of the ground plane, cause the one or more processors to:
receive, based on a user interaction with the display of the AR scene, a particular indication that the user has selected a particular location on the ground plane, and
identify the location in the image as part of the ground plane based on receiving the indication.

20. The non-transitory computer-readable medium of claim 15, wherein the one or more instructions, when executed by the one or more processors, further cause the one or more processors to:
generate a heat map in a manner that maps particular colors to the particular positions along the path, based on an amount of time the user spent at the particular positions along the path; and
wherein the one or more instructions, that cause the one or more processors to cause the vehicle inspection report to be created, cause the one or more processors to:
provide the heat map to the display to permit the heat map to be used to perform the vehicle inspection.

* * * * *